United States Patent
Bolduc

(10) Patent No.: US 11,353,544 B2
(45) Date of Patent: Jun. 7, 2022

(54) METHODS AND SYSTEMS FOR LOCAL TO GLOBAL FRAME TRANSFORMATION

(71) Applicant: Continental Automotive Systems Inc., Auburn Hills, MI (US)

(72) Inventor: Andrew Phillip Bolduc, Royal Oak, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 261 days.

(21) Appl. No.: 16/747,886

(22) Filed: Jan. 21, 2020

(65) Prior Publication Data
US 2021/0190899 A1 Jun. 24, 2021

Related U.S. Application Data

(60) Provisional application No. 62/949,677, filed on Dec. 18, 2019.

(51) Int. Cl.
*G01S 7/00* (2006.01)
*G01S 7/40* (2006.01)
*G01S 13/931* (2020.01)
*G01S 13/00* (2006.01)

(52) U.S. Cl.
CPC ............ *G01S 7/003* (2013.01); *G01S 7/4026* (2013.01); *G01S 13/931* (2013.01); *G01S 7/403* (2021.05); *G01S 2013/9316* (2020.01); *G01S 2013/9323* (2020.01)

(58) Field of Classification Search
None
See application file for complete search history.

(56) References Cited

U.S. PATENT DOCUMENTS

| 2015/0091716 | A1 | 4/2015 | Hathaway et al. |
| 2018/0354506 | A1* | 12/2018 | Minemura ............ G01S 13/931 |
| 2021/0063546 | A1* | 3/2021 | Slobodyanyuk ...... G01S 7/4026 |
| 2021/0096215 | A1* | 4/2021 | Slobodyanyuk ...... G01S 7/4026 |

FOREIGN PATENT DOCUMENTS

| DE | 102014207523 A1 | 10/2015 |
| WO | 2019220353 A2 | 11/2019 |

OTHER PUBLICATIONS

M. Agnes, "Webster's New World College Dictionary"; fourth edition; Wiley Publishing, Inc.; Cleveland, Ohio, USA; copyright in the year 2007; p. 1451, right column entry for the word, "synchronize." (Year: 2007).*

International Search Report and the Written Opinion of the International Searching Authority dated Mar. 31, 2021 for the counterpart PCT Application No. PCT/2020/070924.

* cited by examiner

*Primary Examiner* — Bernarr E Gregory

(57) ABSTRACT

A method includes measuring, with a sensor, a distance between a vehicle in a field of view of the sensor and the sensor, receiving a V2X communication from the vehicle indicative of the positional information of the vehicle, synchronizing the measurement from the sensor with the positional information received from the vehicle, and, using the synchronized data, determining an angular offset of the sensor, the angular offset being the angle between an azimuth of the sensor and the North direction.

20 Claims, 4 Drawing Sheets

METHODS AND SYSTEMS FOR LOCAL TO GLOBAL FRAME TRANSFORMATION

BACKGROUND

Environmental sensor systems provide data to autonomous vehicles such that the vehicles can follow lanes, avoid collisions, re-route around traffic, etc. These systems can also communicate data to driver-operated vehicles to provide updates regarding weather, traffic, road conditions, emergency warnings, etc. The sensor systems include various types of sensors that are mounted to infrastructure (traffic lights, signs, parking meters, etc.) near intersections, along roads, and on buildings in some examples. The sensor systems may be used to recognize lane and crosswalk boundaries, and can also be used to determine distances between vehicles and/or other objects that are stationary or moving in or along the road.

This data is compiled and broadcasted such that the information can be communicated to various entities. One example of a communication system is referred to as "vehicle-to-everything (V2X)" communication, and includes the passing of information from a vehicle to any entity that may affect the vehicle, and vice versa. It is a vehicular communication system that incorporates other more specific types of communication, such as V2I (vehicle-to-infrastructure), V2N (vehicle-to-network), V2V (vehicle-to-vehicle), V2P (vehicle-to-pedestrian), V2D (vehicle-to-device), and V2G (vehicle-to-grid).

SUMMARY

A method according to an example of this disclosure includes measuring, with a sensor, a distance between a vehicle in a field of view of the sensor and the sensor, receiving a V2X communication from the vehicle indicative of the positional information of the vehicle, synchronizing the measurement from the sensor taken at the same time or times with the positional information taken at the same time or times received from the vehicle, and, using the synchronized data, determining an angular offset of the sensor, the angular offset being the angle between an azimuth of the sensor and the North direction.

In a further example of the foregoing, the method includes applying the angular offset to the measurements to obtain modified measurements and transforming the modified measurements into a global frame to report latitude and longitude positions of the vehicle.

In a further example of any of the foregoing, the modified measurements are rotated measurements with respect to North.

In a further example of any of the foregoing, the latitude and longitude positions are communicated to a recipient.

In a further example of any of the foregoing, the recipient is a second vehicle.

In a further example of any of the foregoing, the recipient is a transportation center.

In a further example of any of the foregoing, the method includes measuring, with a sensor, an angle between a vehicle and the sensor.

In a further example of any of the foregoing, the method includes receiving, associating, and determining that steps are performed by one or more computing devices.

In a further example of any of the foregoing, the computing device is in communication with the sensor.

In a further example of any of the foregoing, the method includes utilizing the angular offset, determining the global position of a second vehicle within the field of view of the sensor.

In a further example of any of the foregoing, the sensor is a radar sensor.

In a further example of any of the foregoing, the sensor is a LIDAR sensor.

A system according to an example of this disclosure includes a sensor configured to measure a distance between a vehicle within its field of view and the sensor, and a computing device in communication with the sensor, the computing device configured to receive a V2X communication from the vehicle indicative of the positional information of the vehicle, associate the measurement from the sensor taken at the same time or times with the positional information taken at the same time or times received from the vehicle, and, using the assocaited data, determine an angular offset of the sensor, the angular offset being the angle between an azimuth of the sensor and the North direction.

In a further example of the foregoing, the sensor is mounted to an infrastructure.

In a further example of any of the foregoing, the computing device is configured to apply the angular offset to the measurements to obtain modified measurements and transform the modified measurements into a global frame to report latitude and longitude positions of the vehicle.

In a further example of any of the foregoing, the computing device is configured to communicate the latitude and longitude positions to a recipient.

In a further example of any of the foregoing, the recipient is a second vehicle.

In a further example of any of the foregoing, the recipient is a transportation center.

In a further example of any of the foregoing, the sensor is a radar sensor.

In a further example of any of the foregoing, the sensor is a LIDAR sensor.

DETAILED DESCRIPTION

This disclosure relates generally to utilizing V2X communications to calibrate one or more sensors. In some examples, positional information from a vehicle communicated in a V2X manner is utilized to calibrate a radar sensor.

Figure 1:
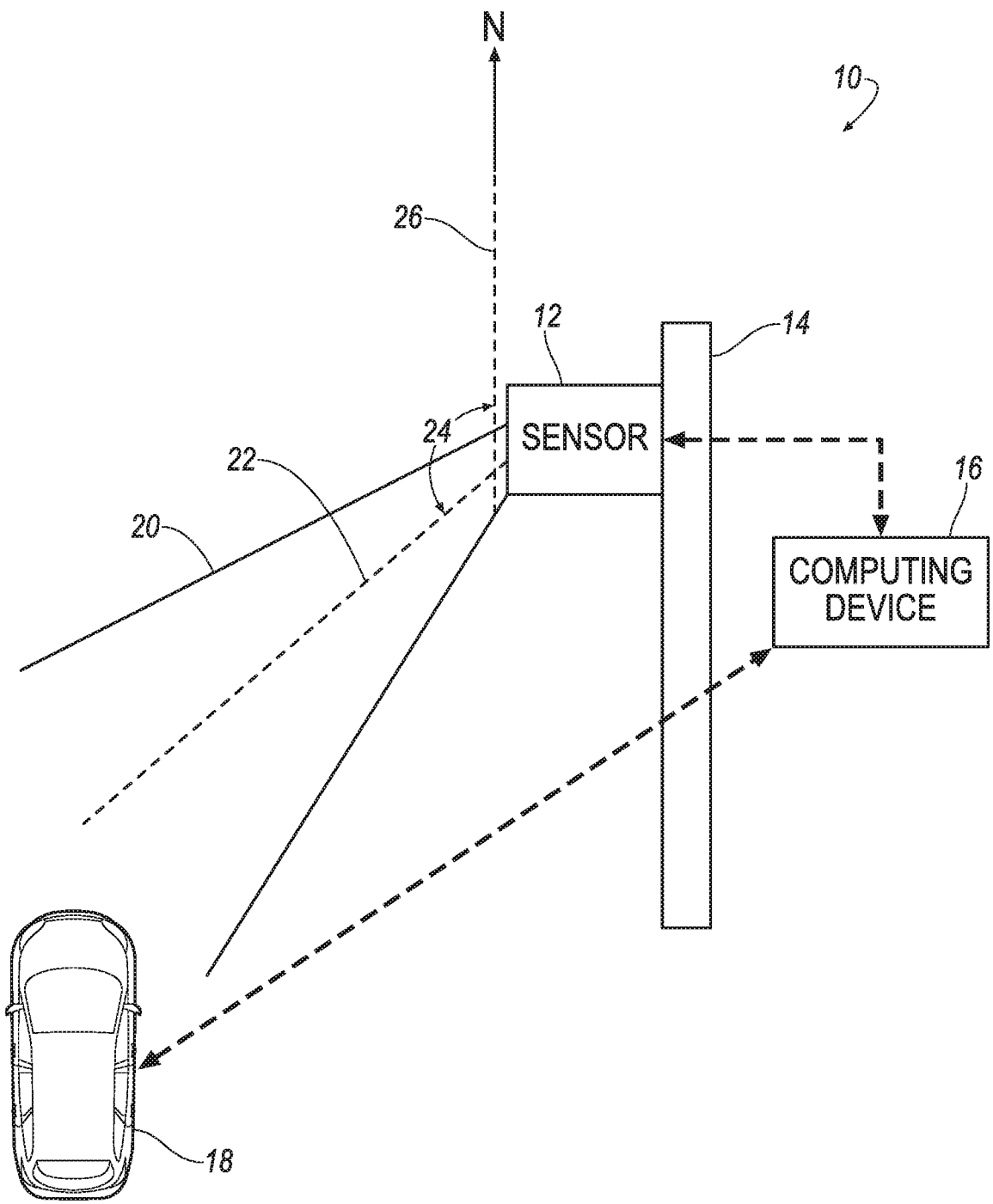
FIG. 1 schematically illustrates an example environmental sensor system.

FIG. 1 schematically illustrates an example environmental sensor system 10 that may include one or more of various types of sensors 12. In some examples, the sensors 12 are mounted to infrastructure 14, some examples of infrastructure 14 including traffic lights, signs, parking meters, etc. In some examples, the infrastructure 14 is located near intersections, along roads, and/or on buildings.

In some examples, as shown, the sensor 12 may be a radar sensor. Although radar sensors are utilized in many of the examples herein, a person of ordinary skill in the art having the benefit of this disclosure would recognize that other range based sensors, such as LIDAR sensors, may benefit from this disclosure. The one or more sensors may be in communication with a computing device 16. The computing device 16 may be programmed with one or more algorithms to execute one or more of the methods or processes disclosed herein.

In some examples, the computing device 16 of the system 10 may include one or more controllers comprising a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

In some examples, the computing device 16 may include a hardware device for executing software, particularly software stored in memory, such as an algorithm for sensor calibration. The computing module 34 may include a custom made or commercially available processor, a central processing unit (CPU), an auxiliary processor among several processors associated with the computing device, a semiconductor based microprocessor (in the form of a microchip or chip set), or generally any device for executing software instructions. The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

In some examples, the software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The controller can be configured to execute software stored within the memory, to communicate data to and from the memory, and to generally control operations of the computing device pursuant to the software. Software in memory, in whole or in part, is read by the processor, perhaps buffered within the processor, and then executed.

As shown schematically in the FIG. 1 example, a vehicle 18 equipped with V2X communication, such as V2I in some examples, enters the field of view (FoV) 20 of the radar sensor 12 and communicates positional information, such as latitude and longitude in some examples, to the computing device 16. The example radar sensor 12 measures distance between the sensor 12 and the vehicle 18, as well as the angle with respect to the azimuth 22 of the radar sensor 12 and the vehicle 18. The azimuth 22 of the radar sensor 12 is known to be the central axis of the FoV 20. The radar sensor 12 communicates the distance and angle measurements to the computing device 16, and the computing device 16 associates the measurements with the positional data from the V2X communication(s) received from vehicle 18 at the same time or times.

In some examples, the vehicle 18 broadcasts over the air its GPS coordinates to the computing device 16 capable of receiving V2X communications. In some examples, multiple data points from each of the vehicle 18 and radar sensor 12 at a same time are associated with each other.

After the computing device 16 associates the measurements with the positional data received from the vehicle 18 at the same time or times, the computing device 16 can determine the angular offset 24 between the azimuth 22 of the radar sensor 12 and the North direction 26. In some examples, the angular offset is determined by solving for the angle in the rotation matrix using a method of best fit, such as linear least squares regression over the dataset, as is known. The computing device 16 can then apply the angular offset 24 to current and future radar measurements from the radar sensor 12, which can be utilized to rotate the radar measurements with respect to North. Once the radar measurements are rotated with respect to North, they can be accurately transformed into the global frame (x, y position to latitude, longitude) to determine latitude and longitude positions of the vehicle 18. Converting from local to global coordinates may be done utilizing known calculation methods. In some examples, this information may be communicated to other vehicles and/or to traffic handling services.

Once the angular offset 24 is known, it can be applied to future readings of the radar sensor 12 to determine the global coordinates of a vehicle or other object within the FoV 20. In some examples, the angular offset 24 may be applied to future readings of the radar sensor 12 to determine the global coordinates of a vehicle within the FoV 20 that does not have V2X capability.

In some examples, the radar could measure the speed of an object traveling through the FoV 20, and the computing device 16 could be programmed to filter out any objects that are not moving. In some examples, the radar sensor 12 may be recalibrated periodically. In some examples, the receipt of the positional information from a vehicle within the FoV 20, communicated through V2X, may trigger the calibration process.

Figure 2:
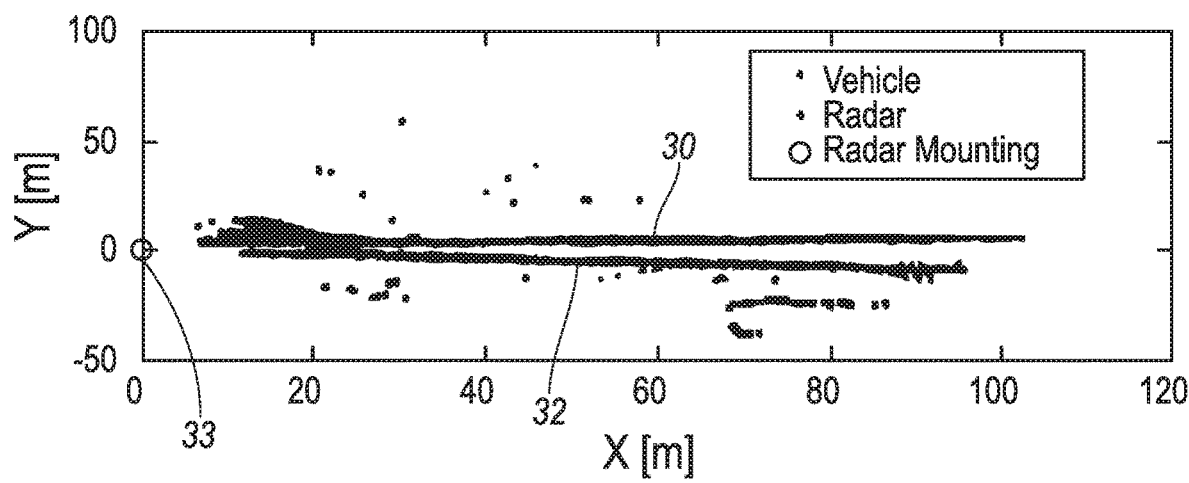
FIG. 2 illustrates an example plot of a vehicle position with data detected by a sensor as well as data received from the vehicle and transformed into the radar frame.

FIG. 2, with continued reference to FIG. 1, illustrates a graph of the position of the vehicle 18 within the field of view of the radar sensor 12 with the GPS coordinates of the vehicle 18 transformed into the radar frame. At 30, a plot of the vehicle position as received from the vehicle 18 and transformed into the radar frame is provided. At 32, a plot of the vehicle position as determined by the radar sensor 12 and computing device 16 is provided. At 33, the position of the radar sensor 12 is provided.

Figure 3:
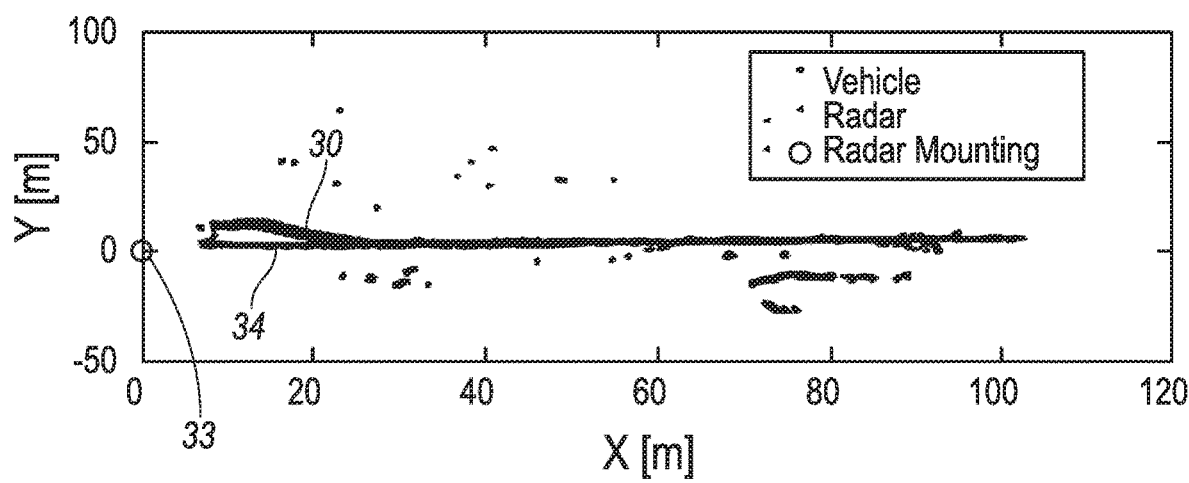
FIG. 3 illustrates an example plot of a vehicle position of FIG. 2 after an angular offset of a sensor is applied.

FIG. 3 illustrates a graph of the position of the vehicle 18 within the field of view of the radar sensor 12 with the GPS coordinates of the vehicle 18 transformed into the radar frame and the readings from the radar sensor 12 adjusted for the angular offset 24. At 30, a plot of the vehicle position as received from the vehicle 18 is provided. At 34, a plot of the vehicle position as determined by the radar sensor 12 and computing device 16 adjusted for the angular offset 24 is provided. That is, applying the offset to the measurement provides a new position of the object with respect to North rather than with respect to the radar sensor 12. At 33, the position of the radar sensor 12 is provided.

Figure 4:
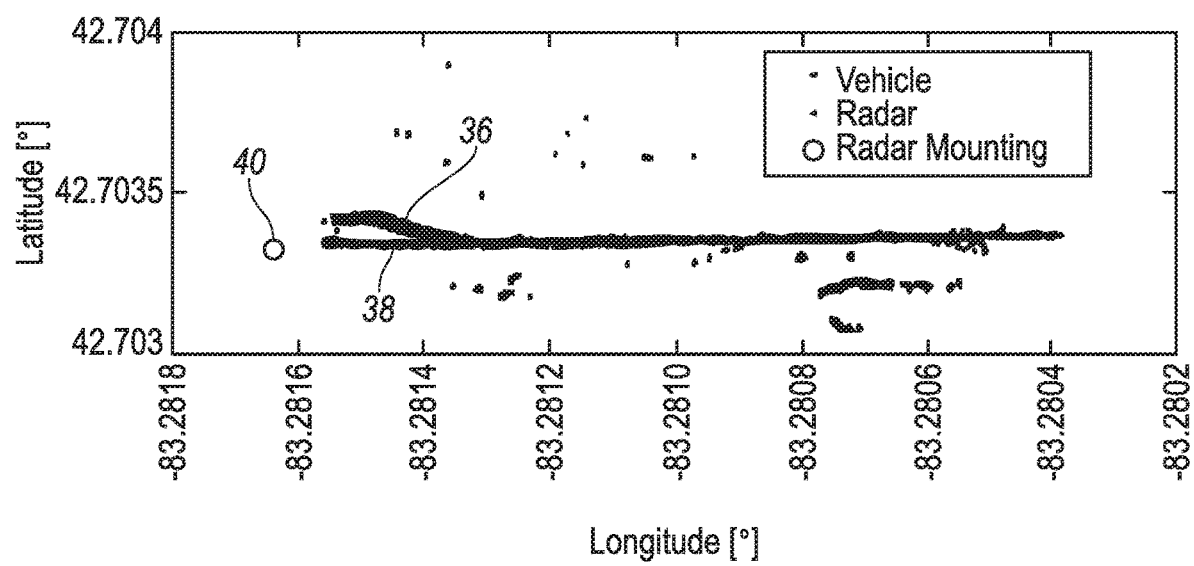
FIG. 4 illustrates an example plot of the vehicle position of FIG. 3 transformed into the global frame.

FIG. 4 illustrates a graph of the position of the vehicle 18, transformed into the global frame, after angular offset has been determined and applied. At 36, a plot of the global position of the vehicle 18 as reported by the vehicle 18 is provided. At 38, a plot of the global position of the vehicle 18 as determined by the radar sensor 12 and computing device 16 is provided. At 40, the global position of the radar sensor 12 is provided.

Figure 5:
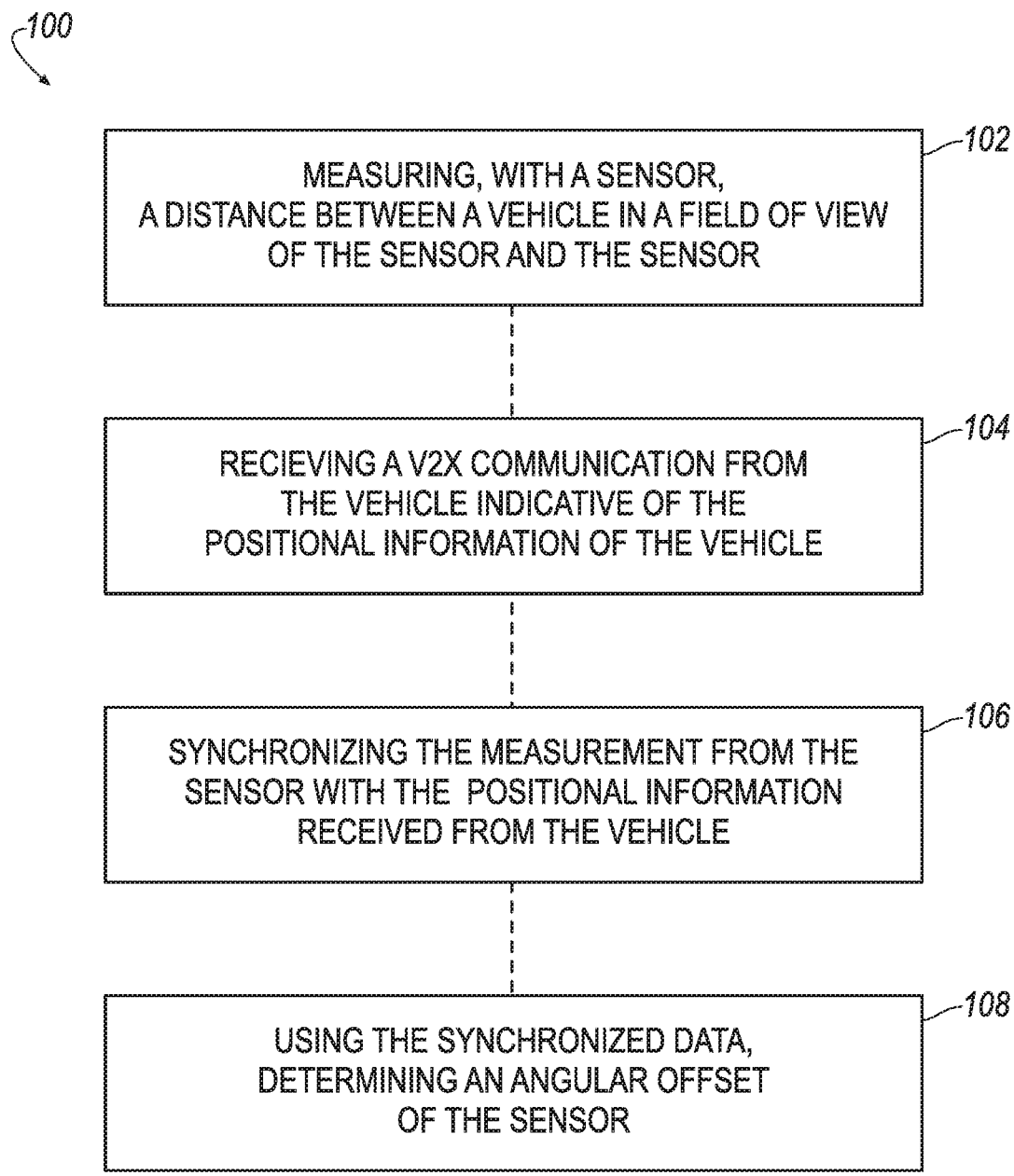
FIG. 5 illustrates a flowchart of an example method.

FIG. 5 illustrates a flowchart of an example method 100 in accordance with one or more examples of this disclosure, such as those described at FIGS. 1-4. At 102, the example method 100 includes measuring, with a sensor, a distance between a vehicle in a field of view of the sensor and the sensor. At 104, the example method 100 includes receiving a V2X communication from the vehicle indicative of the positional information of the vehicle. At 106, the example method 100 includes associating the measurement from the sensor obtained at a time with the positional information obtained at the same time received from the vehicle. At 108, the example method 100 includes using the associated data, determining an angular offset of the sensor, the angular offset being the angle between an azimuth of the sensor and the North direction. In some examples, the receiving, associating, and determining steps are performed by at least one computing device, which may be in communication with the sensor. In some examples the sensor is or more of a radar sensor, LIDAR sensor, or other range based sensor.

In some examples, the method 100 includes applying the angular offset to the measurements to obtain modified measurements and transforming the modified measurements into a global frame to report latitude and longitude positions of the vehicle. In some examples, the modified measurements are rotated measurements with respect to North.

In some examples the method 100 includes communicating the latitude and longitude positions to a recipient. In some examples, the recipient could be any receiving device in communication with the sensor. Some example recipients include a second vehicle or a transportation center, such as the local Department of Transportation. In some examples, communications are openly broadcasted.

In some examples, the method 100 includes measuring, with the sensor, an angle between a vehicle and the sensor.

In some examples, the method 100 includes utilizing the angular offset, determining the global position of a second vehicle within the field of view of the sensor.

In some examples, a system could be said to include a sensor for measuring a distance between a vehicle within its field of view and the sensor. A computing device is in communication with the sensor and receives a V2X communication from the vehicle indicative of the positional information of the vehicle. The computing device associates the measurement from the sensor obtained at a time with the positional information obtained at a same time received from the vehicle. Using the associated data, the computing device determines an angular offset of the sensor, the angular offset being the angle between an azimuth of the sensor and the North direction.

The foregoing description shall be interpreted as illustrative. A worker of ordinary skill in the art would understand that certain modifications could come within the scope of this disclosure. Various examples of the disclosure have been described. Any combination of the described systems, operations, or functions is contemplated. It is possible to use some of the components or features from any of the examples in combination with features or components from any of the other examples. These and other examples are within the scope of the following claims.

What is claimed is:

1. A method comprising:
   measuring, with a sensor, a distance between a vehicle in a field of view of the sensor and the sensor;
   receiving a vehicle-to-everything (V2X) communication from the vehicle indicative of positional information of the vehicle;
   associating the distance between the vehicle and the sensor received from the sensor obtained at a time with the positional information obtained at the same time received from the vehicle; and
   using the associated distance and positional information obtained at the same time, determining an angular offset of the sensor, wherein the angular offset is an angle between an azimuth of the sensor and a North direction.

2. The method as recited in claim 1, the method comprising:
   applying the angular offset to measurements of the sensor to obtain modified measurements; and
   transforming the modified measurements into a global frame to report latitude and longitude positions of the vehicle.

3. The method as recited in claim 2, wherein the modified measurements are rotated measurements with respect to the North direction.

4. The method as recited in claim 2, further comprising:
   communicating the latitude and longitude positions to a recipient.

5. The method as recited in claim 4, wherein the recipient is a second vehicle.

6. The method as recited in claim 4, wherein the recipient is a transportation center.

7. The method as recited in claim 1, further comprising:
   measuring, with the sensor, an angle between the vehicle and the sensor.

8. The method as recited in claim 1, wherein the receiving, associating, and determining steps are performed by at least one computing device.

9. The method as recited in claim 8, wherein the at least one computing device is in communication with the sensor.

10. The method as recited in claim 1, further comprising:
    utilizing the angular offset, determining a global position of a second vehicle within the field of view of the sensor.

11. The method as recited in claim 1, wherein the sensor is a radar sensor.

12. The method as recited in claim 1, wherein the sensor is a LIDAR sensor.

13. A system comprising:
    a sensor configured to measure a distance between a vehicle within a field of view of the sensor and the sensor; and
    a computing device in communication with the sensor, the computing device configured to:
      receive a vehicle-to-everything (V2X) communication from the vehicle indicative of the positional information of the vehicle,
      associate the distance between the vehicle and the sensor received from the sensor obtained at a time with the positional information obtained at the same time received from the vehicle, and
      based on the associated distance and positional information obtained at the same time, determine an angular offset of the sensor, wherein the angular offset is an angle between an azimuth of the sensor and a North direction.

14. The system as recited in claim 13, wherein the sensor is mounted to an infrastructure.

15. The system as recited in claim 13, wherein the computing device is configured to apply the angular offset to measurements of the sensor to obtain modified measurements, and transform the modified measurements into a global frame to report latitude and longitude positions of the vehicle.

16. The system as recited in claim 15, wherein the computing device is configured to communicate the latitude and longitude positions to a recipient.

17. The system as recited in claim 16, wherein the recipient is a second vehicle.

18. The system as recited in claim 16, wherein the recipient is a transportation center.

19. The system as recited in claim 13, wherein the sensor is a radar sensor.

20. The system as recited in claim 13, wherein the sensor is a LIDAR sensor.

* * * * *